United States Patent
Matsumoto et al.

(10) Patent No.: US 8,036,206 B2
(45) Date of Patent: Oct. 11, 2011

(54) WIRELESS COMMUNICATION METHOD AND DEVICE

(75) Inventors: Masao Matsumoto, Aichi-ken (JP); Kazuoki Matsugatani, Kariya (JP)

(73) Assignee: DENSO CORPORATION, Kariya (JP)

( * ) Notice: Subject to any disclaimer, the term of this patent is extended or adjusted under 35 U.S.C. 154(b) by 746 days.

(21) Appl. No.: 12/171,364

(22) Filed: Jul. 11, 2008

(65) Prior Publication Data

US 2009/0016319 A1 Jan. 15, 2009

(30) Foreign Application Priority Data

Jul. 11, 2007 (JP) ................................. 2007-182355

(51) Int. Cl.
*H04J 3/06* (2006.01)
(52) U.S. Cl. ........................................ 370/350; 370/503
(58) Field of Classification Search .......... 370/503–519, 370/350
See application file for complete search history.

(56) References Cited

U.S. PATENT DOCUMENTS

| | | | |
|---|---|---|---|
| 7,447,256 B2 * | 11/2008 | Sudo et al. .................... | 375/147 |
| 7,471,715 B2 * | 12/2008 | Sudo et al. .................... | 375/147 |
| 7,715,337 B2 * | 5/2010 | Watanabe et al. ............ | 370/324 |
| 7,756,506 B2 * | 7/2010 | Suzuki et al. ............. | 455/343.4 |
| 7,787,437 B2 * | 8/2010 | Sakoda ......................... | 370/350 |
| 2008/0279210 A1 | 11/2008 | Naka et al. | |

FOREIGN PATENT DOCUMENTS

| | | |
|---|---|---|
| JP | A-2006-135441 | 5/2006 |
| JP | 2007-060289 | 3/2007 |

OTHER PUBLICATIONS

Office Action dated Jun. 2, 2009 issued from the Japan Patent Office for counterpart application No. 2007-182355 (with English translation).

* cited by examiner

*Primary Examiner* — Thai Hoang
(74) *Attorney, Agent, or Firm* — Posz Law Group, PLC

(57) ABSTRACT

In a commutation system, a data packet is transmitted and received by radio among radio communication apparatuses. In the communication system, the data packet is started to be transmitted on a transmission right acquired on contention type access control in response to a transmission request for the data packet. It is detected that there is a predetermined state in which the transmission request is generated during or after reception of a long packet which is over a given packet length. When the predetermined state is detected, a start timing of the access control is shifted to a timing at which a desired delay time passes after completing reception of the long packet. One example is that an elapse time from a start of reception of the long packet to generation of the transmission request is measured and, as the desired delay time, a period of time calculated by multiplying the measured elapse time by a specified coefficient is set.

12 Claims, 8 Drawing Sheets

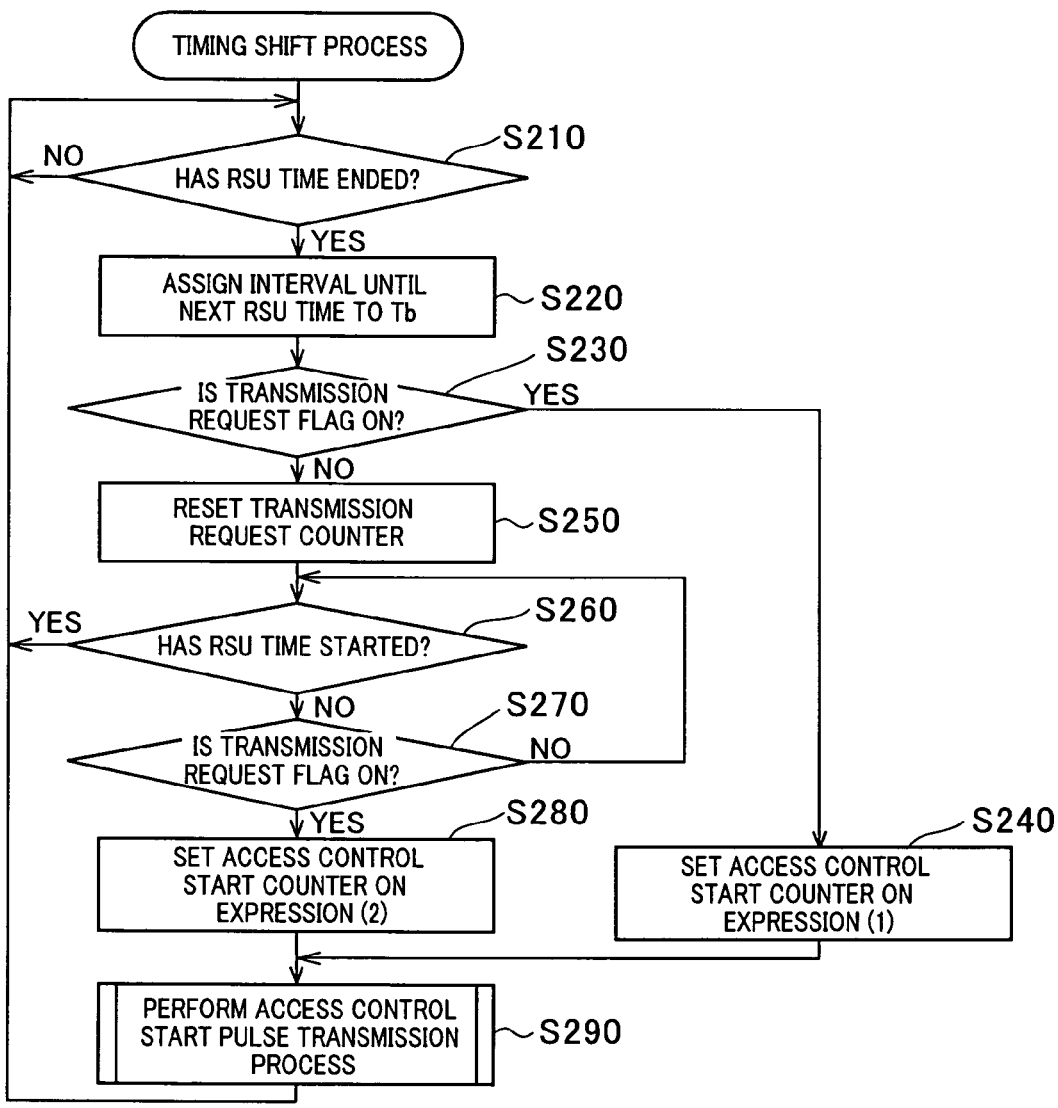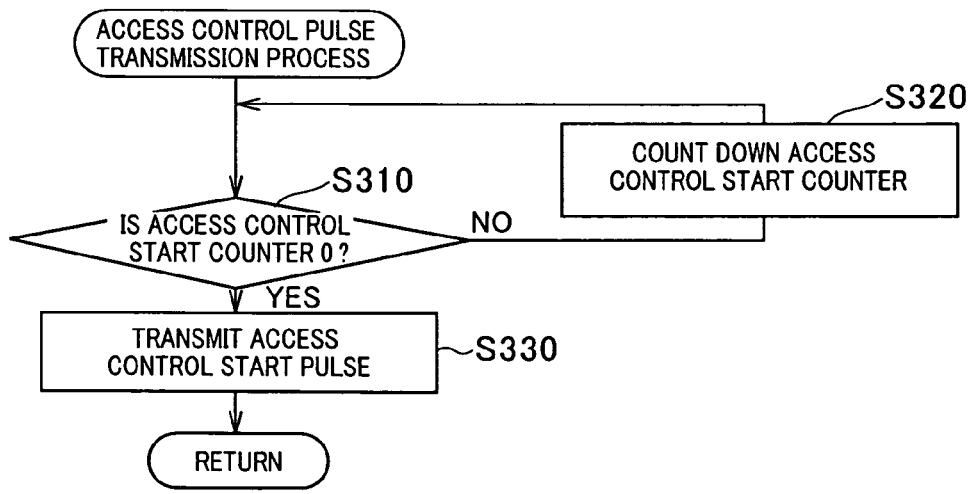

WIRELESS COMMUNICATION METHOD AND DEVICE

CROSS REFERENCES TO RELATED APPLICATION

The present application relates to and incorporates by reference Japanese Patent application No. 2007-182355 filed on Jul. 11, 2007.

BACKGROUND OF THE INVENTION

1. Field of the Invention

The present invention relates to a wireless communication method and a device in which a transmittal right is acquired by conditional access control and data transmission is started.

2. Description of the Related Art

Since the past, a wireless communication system has been proposed in which road-vehicle communication and vehicle-vehicle communication can be performed over a single wireless communication channel (refer to, for example, Japanese Patent Laid-open Application No. 2007-60289).

In the proposed wireless communication system, a transmission signal from a road-side radio communication apparatus includes information on transmission timing of the road-side radio communication apparatus. An on-vehicle radio communication apparatus receiving the transmission signal acknowledges a time at which the road-side radio communication apparatus performs transmission based on the information and stops transmission from the on-vehicle radio communication apparatus during this time.

Therefore, in the wireless communication system, the on-vehicle radio communication apparatus does not interfere with the transmission from the road-side radio communication apparatus. The transmission from the road-side radio communication apparatus to the on-vehicle radio communication apparatus can be given priority and performed with certainty.

In the above-described wireless communication system, the on-vehicle radio communication apparatus stops data transmission while the road-side radio communication apparatus is transmitting data. However, when a data transmission request is generated while the on-vehicle radio communication apparatus is stopped, the on-vehicle wireless communication system enters a data transmission wait state. The on-vehicle wireless communication system starts conditional access control to promptly start data transmission when the road-side radio communication apparatus stops data transmission and a wireless communication channel becomes free.

Therefore, in the above-described wireless communication system, for example, as shown in FIG. 14, when a data transmission is time of the road-side radio communication apparatus (road-side unit [RSU]) increases and a number of on-vehicle radio communication apparatuses for which transmission requests are generated during the data transmission time increases, when the data transmission by the road-side radio communication apparatus subsequently ends, a large number of on-vehicle radio communication apparatuses in a transmission wait state until this point simultaneously start access control. As a result, a temporary excessive traffic state occurs in the wireless communication channel. Probability of transmission packet collision increases.

A problem such as this is not limited to the above-described wireless communication system. The problem similarly occurs when a wireless communication system is that in which a plurality of radio communication apparatuses share a single wireless communication channel.

In other words, in the wireless communication system, when a certain radio communication apparatus starts to transmit a packet that is significantly longer that at an ordinary time (referred to, hereinafter, as a long packet), because other radio communication apparatuses cannot transmit data during this time, the number of radio communication apparatuses entering a data transmission wait state increases.

Therefore, even in a typical wireless communication system such as this, a large number of radio communication apparatuses in the data transmission wait state simultaneously start access control when the certain radio communication apparatus completes transmission of the long packet. In a similar manner as that described above, the temporary excessive traffic state occurs. The probability of transmission packet collision increases.

SUMMARY OF THE INVENTION

The present invention has been achieved in light of such problems. An object of the present invention is to prevent a situation in a wireless communication system in which, when a transmission of a long packet from a certain radio communication apparatus is completed, other radio communication apparatuses in a transmission wait state simultaneously start access control.

In order to achieve the above object, as one aspect, the present invention provides a method of communicating a data packet by radio, wherein the data packet is started to be transmitted on a transmission right acquired on contention type access control in response to a transmission request for the data packet. The method comprises detecting a predetermined state in which the transmission request is generated in association with reception of a long packet which is over a given packet length, and shifting a start timing of the access control to a timing at which a desired delay time passes after completing reception of the long packet, when the predetermined state is detected.

Therefore, the wireless communication method of the present invention can distribute timings at which radio communication apparatuses in a transmission wait state when a road-side radio communication apparatus or a certain radio communication apparatus transmits a long packet start access control when the long packet transmission is completed, and reduce probability of collision between transmission packets from each radio communication apparatus, by the wireless communication method being applied to on-vehicle radio communication apparatuses in the above-described wireless communication system configured by a road-side radio communication apparatus and a plurality of on-vehicle radio communication apparatuses or radio communication apparatuses in a wireless communication system in which a plurality of radio communication apparatuses perform data transmission using a shared wireless communication channel.

It is particularly preferred that the shifting step includes measuring an elapse time from a start of reception of the long packet to generation of the transmission request; and setting, as the desired delay time, a period of time calculated by multiplying the measured elapse time by a specified coefficient.

In other words, as a result, the start timing of the access control set after the reception of the long packet is completed is delayed according to a delay time proportional to an elapsed time (in other words, a time unique to the radio communication apparatus) from when the reception of the long packet is started until a transmission request is generated. Therefore, a probability of the access control start timings after completion of the long packet reception being the same among the radio communication apparatuses using the method of the present invention (and probability of transmission packet collision) can be more favorably reduced.

Other advantageous configurations and operations of the present invention will be clarified through preferred embodiments described with the accompanying drawings.

BRIEF DESCRIPTION OF THE DRAWINGS

In the accompanying drawings:

FIG. 3 is a flowchart of a time shift process according to the first embodiment;

FIG. 4 is a flowchart of an access control pulse transmission process according to the first embodiment;

DETAILED DESCRIPTION OF THE PREFERRED EMBODIMENTS

Embodiments of the present invention will be described below with reference to the drawings.

First Embodiment

Figure 1:
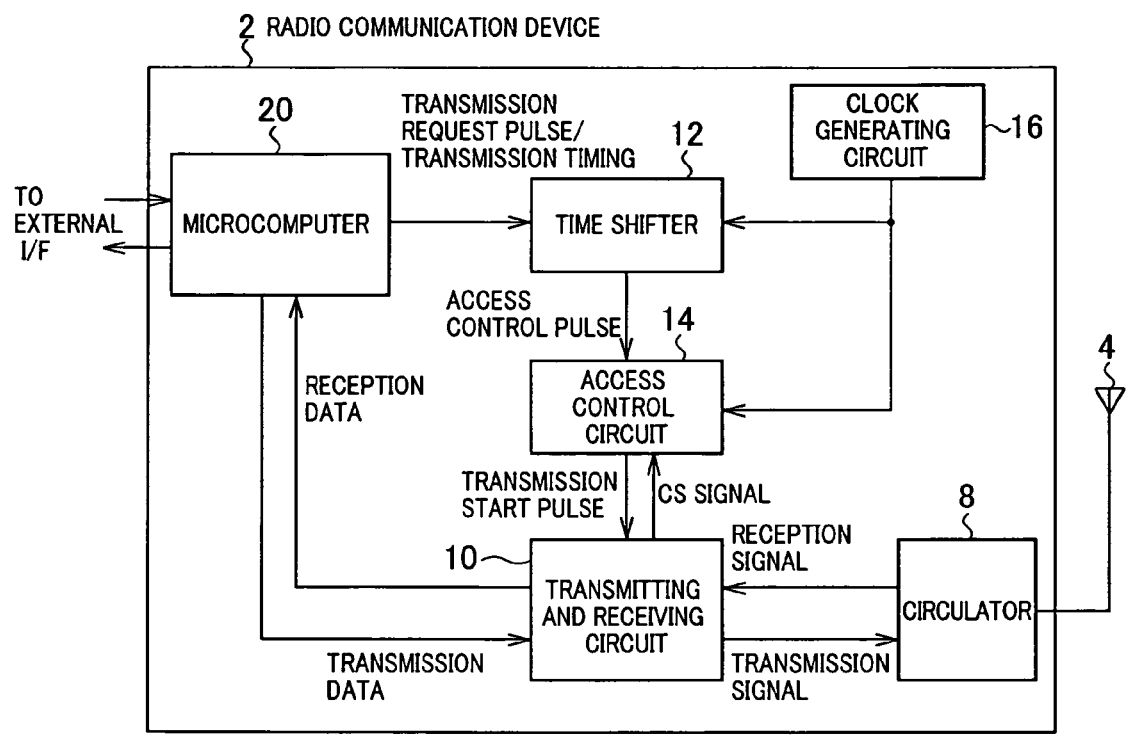
FIG. 1 is a block diagram of a configuration of a radio communication apparatus according to a first embodiment.

FIG. 1 is a block diagram of a configuration of an on-vehicle radio communication apparatus according to a first embodiment of the present invention.

An on-vehicle radio communication apparatus (referred to, hereinafter, as simply a radio communication apparatus) 2 according to the embodiment is mounted on an automobile and is used to perform wireless communication between a road-side radio communication apparatus and other on-vehicle radio communication apparatuses. The radio communication apparatus 2 includes a transmitting and receiving circuit 10 connected to an antenna 4 via a circulator 8, a microcomputer 20 that controls operation of the transmitting and receiving circuit 10 and processes transmission and reception data, an access control circuit 14 that performs conditional access control, a time shifter 12 that receives a transmission request pulse outputted from the microcomputer 20 and outputs an access control pulse to the access control circuit 14, and a clock generating circuit 16 that provides the time shifter 12 and the access control circuit 14 with a clock.

Here, the transmitting and receiving circuit 10 is equivalent to a transmitting and receiving means of the present invention. The transmitting and receiving circuit 10 adds a packet header for wireless communication to transmission data sent from the microcomputer 20. The transmitting and receiving circuit 10 modulates the transmission data and generates a data packet for transmission. When a transmission start pulse is inputted from the access control circuit 14, the transmitting and receiving circuit 10 outputs the data packet to the antenna 4 via the circulator 8, thereby wirelessly transmitting the data packet from the antenna 4.

In addition, the transmitting and receiving circuit 10 receives a reception signal from the antenna 4 via the circulator 8 and demodulates a data packet from the reception signal. The transmitting and receiving circuit 10 deletes the packet header for wireless communication and transfers reception data from which the packet header has been deleted to the microcomputer 20. Moreover, when a received power equal to or more than a certain constant value is detected, the transmitting and receiving circuit 10 outputs a carrier sense signal (CS signal) to the access control circuit 14.

Next, the microcomputer 20 is equivalent to a communication controlling means of the present invention. The microcomputer 20 outputs the transmission request pulse using a transmission request from an on-vehicle device inputted via an external I/F or a transmission request from an internal application as a trigger. In addition, the microcomputer 20 processes information inputted from the on-vehicle device via the external I/F and information generated by the internal application, and creates transmission data for wireless communication. Then, the microcomputer 20 transfers the created transmission data to the transmitting and receiving circuit 10.

In addition, the microcomputer 20 processes the reception data received by the transmitting and receiving circuit 10, transfers information to the on-bard device via the external I/F, and provides the internal application with information. In addition, the microcomputer 20 converts time required until the road-side radio communication apparatus starts a next transmission and time over which the transmission continues to a number of counts of an internal clock, based on data related to a transmission timing acquired from the road-side radio communication apparatus, and notifies the time shifter 12 of the number of counts.

In other words, in a communication system using the radio communication apparatus 2 according to the embodiment, the road-side radio communication apparatus can preferentially transmit a long packet to the on-vehicle radio communication apparatus. The road-side radio communication apparatus notifies surrounding on-vehicle radio communication apparatuses of a length (time length) of a time slot during which the long packet is transmitted and a time (time interval) between time slots. According to the embodiment, based on the data acquired from the on-vehicle radio communication apparatus, the microcomputer 20 notifies the time shifter 12 of transmission timing and length of a next long packet from the road-side radio communication apparatus.

Next, the access control circuit 14 is a circuit actualizing media access control (MAC) such as that prescribed in IEEE 802.11. The access control circuit 14 checks that other radio communication apparatuses are not transmitting radio waves based on the carrier sense signal (CS signal) obtained from the transmitting and receiving circuit 10, and outputs a transmission start pulse to the transmitting and receiving circuit 10. As a result, the access control circuit 14 prevents a transmission packet from the radio communication apparatus 2 and a transmission packet from another radio communication apparatus from colliding and prevents occurrence of packet loss. The access control circuit 14 is equivalent to an access controlling means of the present invention. The access control circuit 14 can be any access control circuit as long as the access control circuit performs the conditional access control.

Next, the time shifter 12 is equivalent to a transmission request delaying means of the present invention. When the transmission request pulse is received from the microcomputer 20, the time shifter 12 shifts (delays) a transmission request timing so that the access control starts at a time period other than the time slot during which the road-side radio communication apparatus transmits the long packet, based on the transmission timing of the next long packet from the road-side radio communication apparatus and the length (time length) of the long packet acquired from the microcomputer 20. The time shifter 12 then outputs the access control pulse to the access control circuit 14.

An operation performed by the time shifter 12 will be described below with reference to flowcharts shown in FIG. 2 to FIG. 4.

The time shifter 12 according to the embodiment includes a transmission request detecting section and a timing shift section that operate in parallel. FIG. 2 is a flowchart of a transmission request detection process performed by the transmission request detecting section. FIG. 3 and FIG. 4 are flowcharts of a timing shift process performed by the timing shift section.

Figure 2:
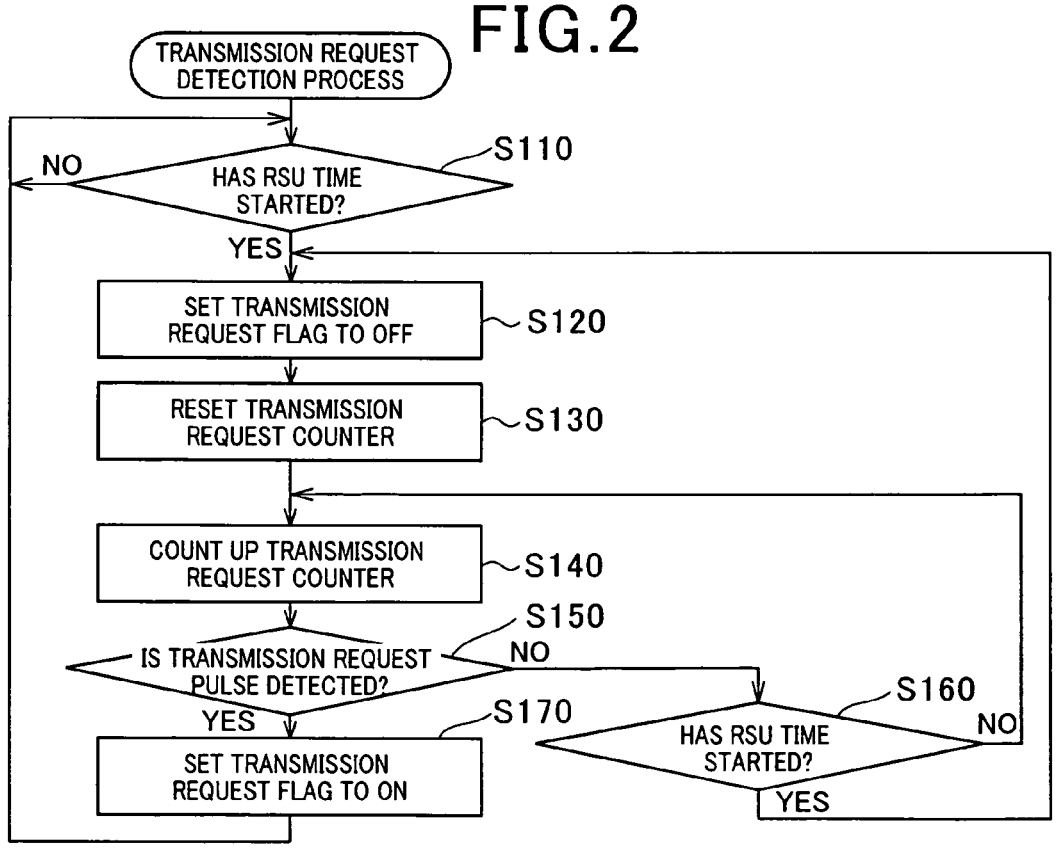
FIG. 2 is a flowchart of a transmission request detection process according to the first embodiment.

As shown in FIG. 2, first, at step S110 (s indicates Step), the transmission request detecting section of the time shifter 12 judges whether a time slot (referred to, hereinafter, as an RSU time) during which the road-side radio communication apparatus transmits the long packet has started, based on a clock count value until a next transmission timing of the road-side radio communication apparatus provided by the microcomputer 20.

When judged at step S110 that the RSU time has not started, the transmission request detecting section waits for the road-side radio communication apparatus to start the transmission of the long packet by performing again the judgment process at step S110. When judged at step S110 that the RSU time has started, the transmission request detecting section proceeds to S120 and sets a transmission request flag to OFF.

The transmission request flag is a flag indicating whether the transmission request has been made. ON indicates that the transmission request has been generated. OFF indicates that the transmission request has not been generated. As a result of the transmission request flag, the timing shift section can be notified of whether the transmission request is generated during the time slot for road-vehicle communication or at another time.

Next, at step S130, the transmission request detecting section resets a transmission request counter to a value "0". At step S140, the transmission request counter is counted upwards by only a value "1". Then, at subsequent S150, the transmission request detecting section judges whether the transmission request pulse inputted from the microcomputer 20 is detected. When the transmission request pulse is not detected the transmission request detecting section judges at step S160 whether the RSU time has started. When the RSU time has not started, the transmission request detecting section returns to S140 again and counts upwards the transmission request counter.

In other words, at steps S140 and S150, an elapsed time from when the RSU time starts (namely when the road-side radio communication apparatus starts the transmission of the long packet) until the microcomputer 20 generates the transmission request is measured using the transmission request counter.

When judged at step S160 that the RSU time has started, because the transmission request is not generated within a single time slot cycle time, from when the road-side radio communication apparatus starts a previous long packet transmission until when the road-side radio communication apparatus starts a next long packet transmission, the transmission request detecting section returns to S120 again and performs the process by procedures similar to those described above.

In addition, when judged at step S150 that the transmission request pulse is detected, the transmission request detecting section proceeds to S170, sets the transmission request flag to ON, and returns to S110 again.

Next, first, at step S210, the time shifting section of the time shifter 12 judges whether the RSU time has ended based on the clock count value until the time slot for the long packet transmission by the road-side radio communication apparatus has ended, provided by the microcomputer 20.

Then, when judged at step S210 that the RSU time has not ended, the time shifting section waits for the road-side radio communication apparatus to complete the transmission of the long packet by performing the judgment process at step S210 again. When judged at step S210 that the RSU time has ended, the time shifting section proceeds to S220. A clock count number until the start of the next time slot notified by the microcomputer 20 is assigned as data Tb indicating a time interval of the time slots.

Next, at step S230, the time shifting section judges whether the transmission request flag is ON, thereby judging whether the transmission request is generated during the time slot during which the road-side radio communication apparatus is transmitting the long packet.

Then, when the transmission request flag is ON and the transmission request is generated during the time slot during which the road-side radio communication apparatus transmits the long packet, the time shifting section proceeds to S240. The time shifting section sets an access control start counter such that a time Ts until the access control starts after the end of the time slot becomes $$Ts = Tr \cdot Tb/(Tp+Tb) \qquad (1),$$

using the value of the transmission request counter (here, a count value indicating an elapsed time Tr from when the road-side radio communication apparatus starts the long packet transmission until when the transmission request is generated), a count value indicating the time interval of the time slots assigned as the data Tb at step S220, and a value indicating a length (time) Tp of the time slot during which the road-side radio communication apparatus transmits the long packet (see FIG. 5(*a*)).

At the same time, when judged at step S230 that the transmission request flag is OFF, the transmission request is not generated during the time slot during which the road-side radio communication apparatus transmits the long packet. Therefore, the time shifting section proceeds to S250 and resets the transmission request counter to make the transmission request detecting section measure a time required until the transmission request is generated after the end of the time slot.

Then, the time shifting section judges at step S260 whether the RSU time has started. When the RSU time has not started, the time shifting section proceeds to S270 and judges whether the transmission request flag is ON. When the transmission request flag is not ON, the time shifting section returns again to S260. Through this procedure, the time shifting section waits until the transmission request is generated, until the road-side radio communication apparatus starts a transmission of a next long packet.

When judged at step S260 that the RSU time has started, because the transmission request has not been generated within the single time slot cycle time, from when the road-side radio communication apparatus starts a previous long packet transmission until when the road-side radio communication apparatus starts the next long packet transmission, the transmission request detecting section returns to S210 again.

Figure 5A:
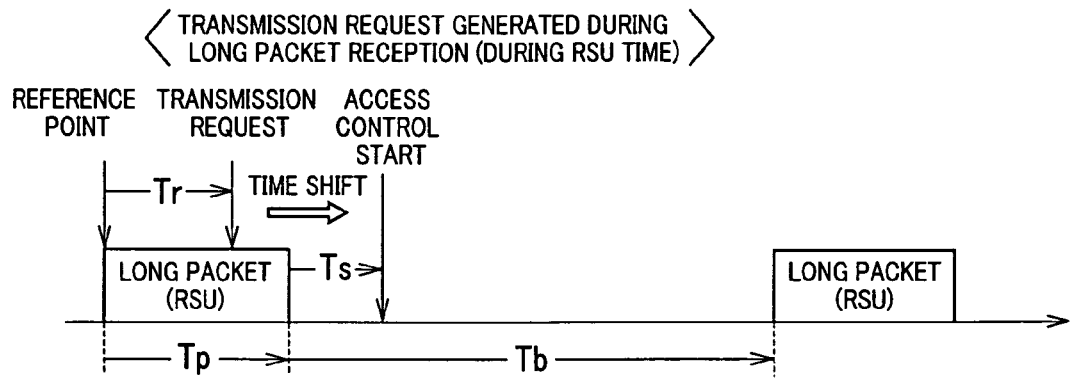
FIGS. 5A and 5B are explanatory diagrams of a shift (delay) operation for access control according to the first embodiment.
Figure 5B:
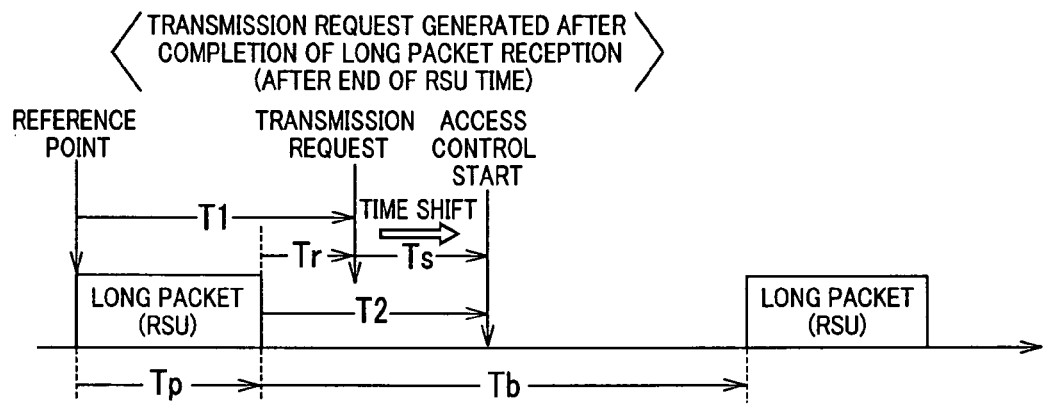

Next, when judged at step S270 that the transmission request flag is ON, the time shifting section proceeds to S280. The time shifting section sets the access control start counter such that the delay time Ts until the access control starts after the transmission request is generated becomes $$Ts=Tp\cdot(Tb-Tr)/(Tp+Tb) \qquad (2)$$

using the value of the transmission request counter (here, the count value indicating the elapsed time Tr from when the road-side radio communication apparatus completes the long packet transmission until when the transmission request is generated), the count value indicating the time interval of the time slots assigned as the data Tb at step S220, and the value indicating the length (time) Tp of the time slot during which the road-side radio communication apparatus transmits the long packet (see FIG. 5(b)).

As shown in FIG. 5(b), the process at step S280 is a process for setting a start timing for the access control so that a delay timing T2 until the access control is started after reception of the long packet has been completed is a ratio (Tb/(Tp+Tb)) of the time interval Tb to a time (Tp+Tb) that is a sum of the time length Tp and the time interval Tb of the long packet multiplied by the elapsed time from when the reception of the long packet has started until the transmission request is generated, in adherence to the above-described expression (2). Thus the expression (2) can be expressed by a modified expression of $$T2=T1\cdot Tb/(Tp+Tb) \qquad (2'),$$

where T2 denotes the delay time and T1 denotes the elapsed time.

In other words, according to the embodiment, the transmission request counter is reset after the reception of the long packet is completed and the time Tr until the transmission request is generated is measured. Moreover, the start timing of the access control is controlled by the elapsed time Ts after the generation of the transmission request. Therefore, an expression (3) for calculating the elapsed time Ts is derived as described below to realize the above-described expression (2). The start timing of the access control is set using the expression (3).

$$\begin{aligned} Ts &= T1 \cdot Tb/(Tp+Tb) - (T1-Tp) \\ &= Tp \cdot (Tb-(T1-Tp))/(Tp+Tb) \\ &= Tp \cdot (Tb-Tr)/(Tp+Tb) \end{aligned} \qquad (3)$$

Next, when the time Ts until the access control is started is set in the access control start counter at step S240 or S280, the time shifting section proceeds to S290 and performs an access control pulse transmitting process. The time shifting section then returns to S210 again.

As shown in FIG. 4, in the access control pulse transmitting process, the time shifting section judges at step S310 whether the access control start counter is the value "0". When the access control start counter is not the value "0", the time shifting section counts downward the access control start counter by only the value "1" at step S320. The time shifting section then returns to S310 again. Through this procedure, the time shifting section successively counts downwards the access control start counter synchronously with the clock. Then, when the access control start counter becomes the value "0" (YES-S310), the time shifting section proceeds to S330 and outputs the access control pulse to the access control circuit 14. As a result, the time shifting section starts the access control performed by the access control circuit 14 and ends the process.

As described above, in the radio communication apparatus 2 according to the embodiment, when the transmission request is generated in the microcomputer 20, the start timing of the access control is delayed (time shifted) by a constant ratio (Tb/(Tp+Tb)) based on a length (Tp) of the time slot and the time interval (Tb) of the time slot when the road-side radio communication apparatus performs the transmission of the long packet so that the access control corresponding to the transmission request are all started at a free time (Tb) at which the road-side radio communication apparatus is not transmitting the long packet (see FIGS. 5(a) and (b)).

Figure 6:
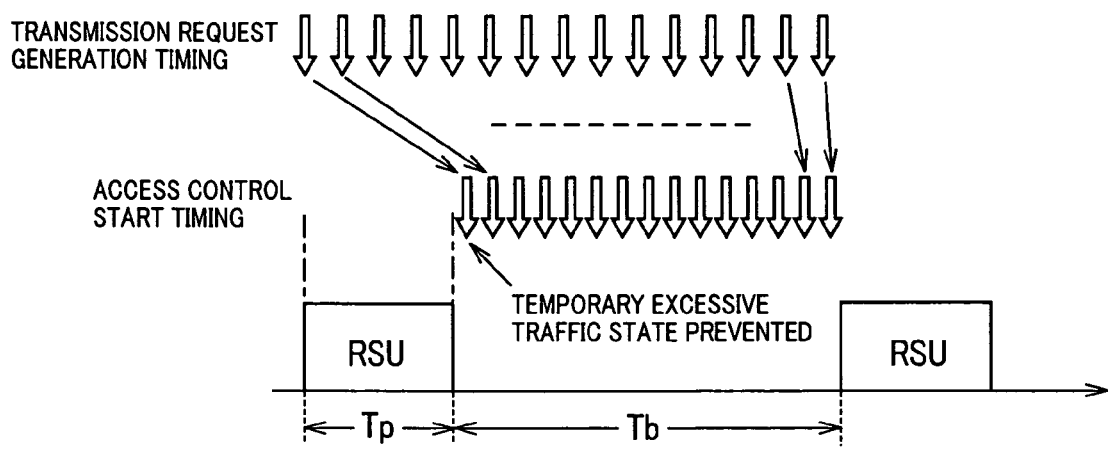
FIG. 6 is an explanatory diagram explaining an effect according to the first embodiment.

Therefore, when the radio communication apparatus 2 according to the embodiment is mounted on each vehicle and the wireless communication system is configured in which communication between the road and the vehicle and communication between vehicles are performed, as shown in FIG. 6, the transmission request generation timing of each on-vehicle radio communication apparatus can be equally distributed, in a compressed manner in the time domain, over the free time (Tb) at which the road-side radio communication apparatus (RSU) is not transmitting the long packet. A situation in which a large number of on-vehicle radio communication apparatuses simultaneously start the access control immediately after the road-side radio communication apparatus (RSU) completes the transmission of the long packet and a temporary excessive traffic state occurs can be prevented. Therefore, in the radio communication apparatus 2 according to the embodiment, the probability of packet collision can be reduced and equity of the communication among the on-vehicle radio communication apparatuses can be maintained.

Second Embodiment

Next, a second embodiment of the present invention will be described.

The radio communication apparatus 2 according to the embodiment is used in a typical wireless communication system, in which a radio communication apparatus transmitting a long packet cannot be identified and a packet length (time length) of the long packet and the time interval of the long packets cannot be known in advance.

Figure 7:
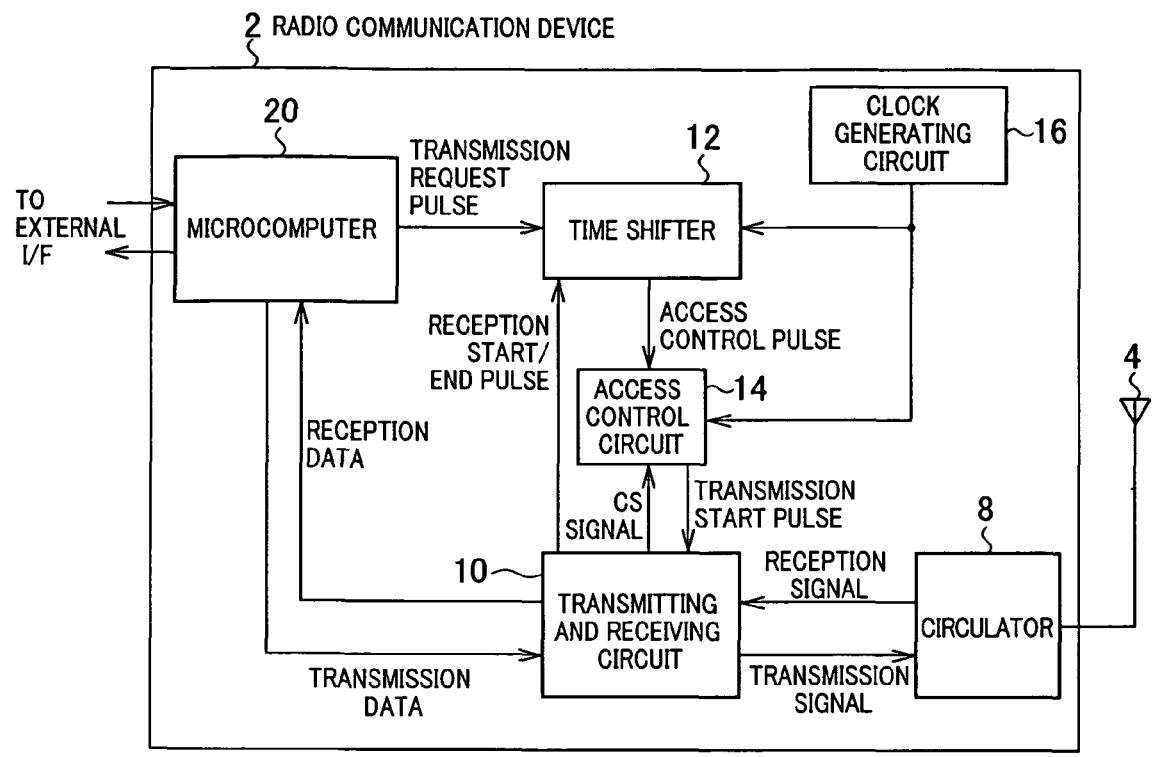
FIG. 7 is a block diagram of a configuration of a radio communication apparatus according to a second embodiment.

Therefore, although, like the radio communication apparatus according to the first embodiment, the radio communication apparatus 2 according to the embodiment includes the antenna 4, the circulator 8, the transmitting and receiving circuit 10, the microcomputer 20, the time shifter 12, the access control circuit 14, and the clock generating circuit 16, as shown in FIG. 7, the microcomputer 20 cannot obtain information related to the long packet from the reception data. Therefore, when the transmitting and receiving circuit 10 starts reception and completes reception of a data packet from another radio communication apparatus, the microcomputer 20 generates a reception start pulse and a reception end pulse.

The time shifter 12 counts a packet length of the received data packet based on each pulse. Based on a count result, the time shifter 12 judges whether the received packet is a long packet and controls a start timing for the access control.

Here, according to the embodiment, an operation of the time shifter 12 that differs from that according to the first embodiment will mainly be described.

First, the time shifter 12 according to the embodiment includes a packet length detecting section in addition to the transmission request detecting section and the timing shift section. The packet length detecting section operates in parallel with each of the sections.

Figure 8:
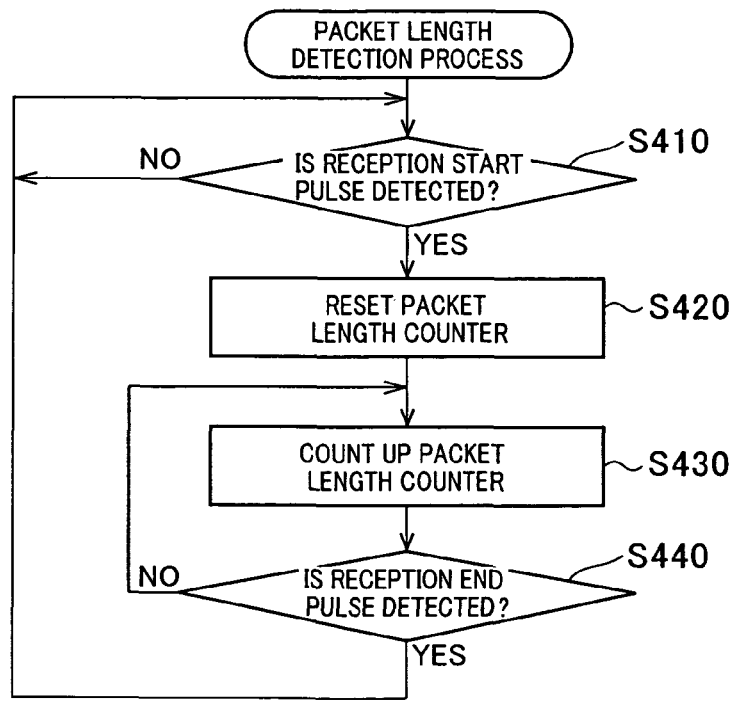
FIG. 8 is a flowchart of a packet length detection process according to the second embodiment.

FIG. 8 is a flowchart of a packet length detection process performed by the packet length detecting section.

As shown in FIG. 8, the packet length detecting section judges at step S410 whether a reception start pulse outputted from the transmitting and receiving circuit 10 is detected. As a result, the packet length detecting section waits until the reception start pulse is detected. When the reception start pulse is detected, the packet length detecting section resets a packet length counter to a value "0" at step S420.

Next, at step S430, the packet length detecting section counts upwards the packet length counter by only a value "1". At subsequent S440, the packet length detecting section judges whether a reception end pulse outputted from the transmitting and receiving circuit 10 is detected. Then, when judged at step S440 that the reception end pulse is not detected, the pulse length detecting section returns to S430 again and counts upwards the packet length counter. When judged at step S440 that the reception end pulse is detected, the pulse length detecting section returns to S410.

In other words, in the packet length detection process, from when the reception start pulse is judged to be detected at step S410 to when the reception end pulse is judged to be detected at step S440, the packet length counter is repeatedly counted upwards synchronously with the clock at step S430. As a result, the packet length (time length) of the data packet received by the transmitting and receiving circuit 10 is measured.

Figure 9:
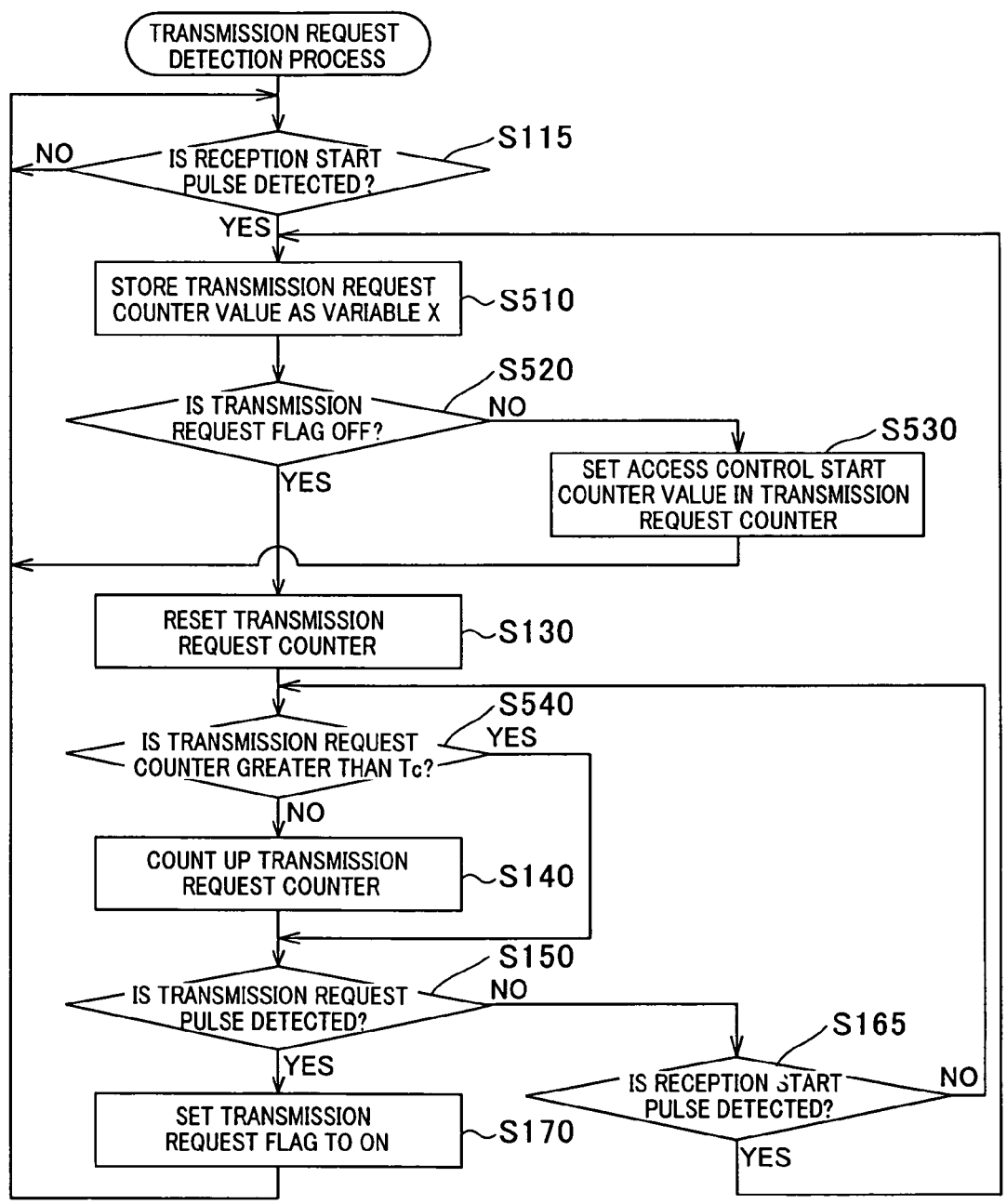
FIG. 9 is a flowchart of a transmission request detection process according to the second embodiment.
Figure 10:
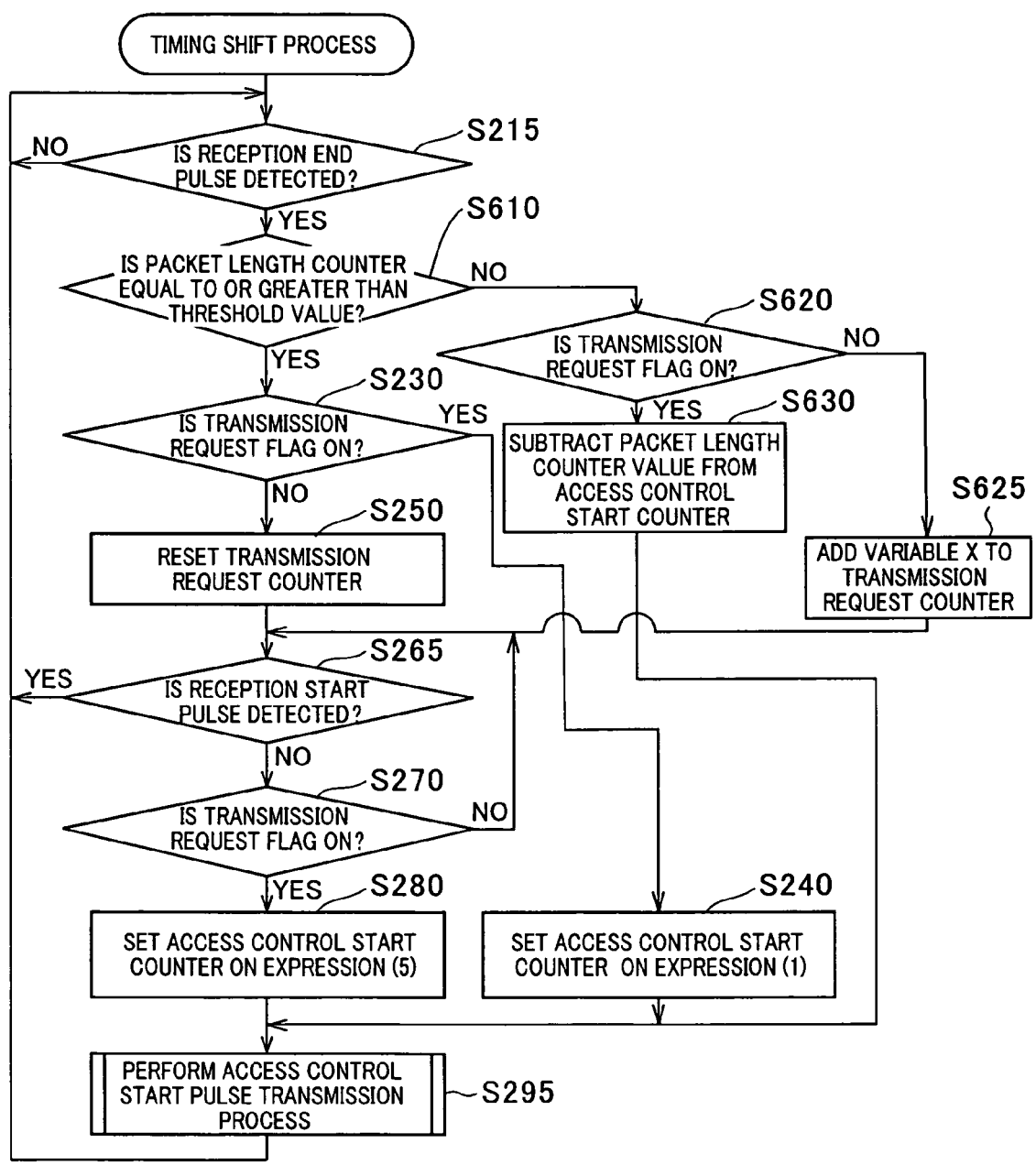
FIG. 10 is a flowchart of a timing shift process according to the second embodiment.
Figure 11:
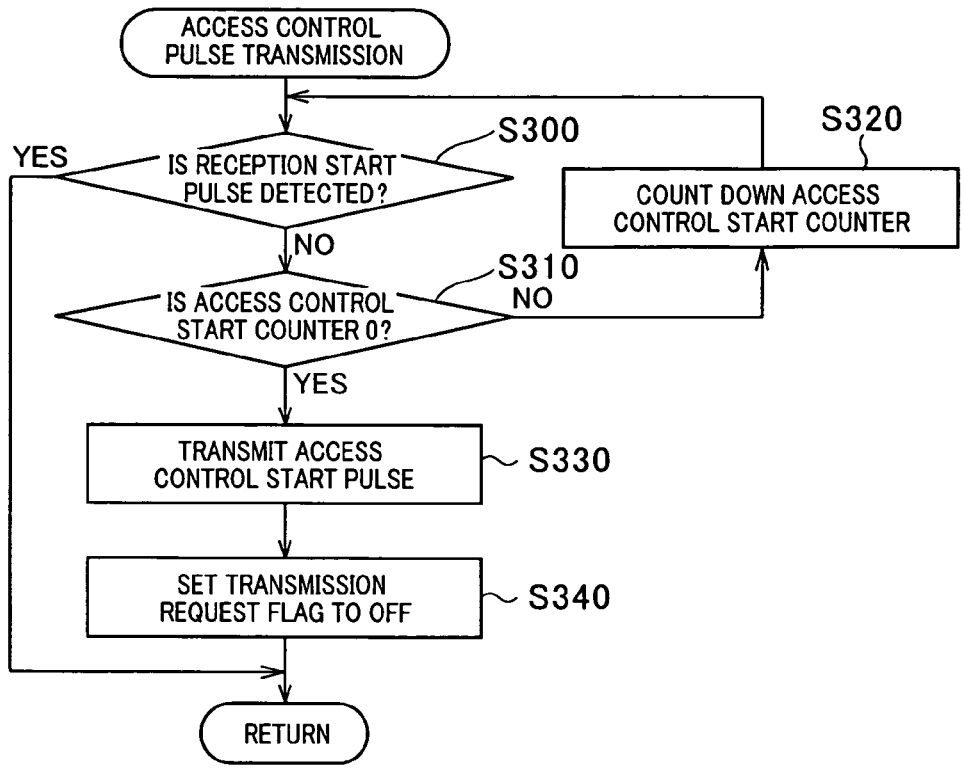
FIG. 11 is a flowchart of an access control pulse transmission process according to the second embodiment.

Next, FIG. 9 is a flowchart of a transmission request detection process performed by the transmission request detecting section. FIG. 10 and FIG. 11 are flowcharts of a timing shift process performed by the timing shift section. In the flowcharts in FIG. 9 to FIG. 11, processes that are the same as those shown in FIG. 2 to FIG. 4 are given the same step numbers.

As shown in FIG. 9, first, at step S115, the transmission request detecting section according to the embodiment judges whether the reception start pulse outputted from the transmitting and receiving circuit 10 is detected. As a result, the transmission request detecting section waits for the transmitting and receiving circuit 10 to receive transmission data from another radio communication apparatus.

Then, when judged at step S115 that the reception start pulse is detected, at step S510, the transmission request detecting section holds a current transmission request counter value as a variable X. The transmission request detecting section proceeds to S520 and judges whether the transmission request flag is OFF.

When judged at step S520 that the transmission request flag is OFF, because an unprocessed transmission request is not present before the current reception start pulse is detected, the transmission request detecting section proceeds to S130 and resets the transmission request counter to the value "0". At subsequent S540, the transmission request detecting section judges whether the transmission request counter has exceeded a clock conversion value of a collision relaxation time Tc set in advance.

When the transmission request counter does not exceed the clock conversion value of the collision relaxation time Tc, after counting upwards the transmission request counter at step S140, the transmission request detecting section at step S140 proceeds to S150. When the transmission request counter exceeds the clock conversion value of the collision relaxation time Tc, the transmission request detecting section proceeds directly to S150.

The collision relaxation time Tc is a parameter used in place of the time interval Tb between the long packets according to the first embodiment. A fixed value set in advance is used according to the embodiment. However, the collision relaxation time Tc can, for example, be set based on a packet length (time length) of the long packet, to a value that is several times the time.

Then, as according to the first embodiment, the transmission request detecting section judges whether the transmission request pulse is detected at step S150. When the transmission request pulse is detected, after setting the transmission request flag to ON at step S170, the transmission request detecting section returns to S115. On the other hand, when the transmission request pulse is not detected, the transmission request detecting section judges whether the reception start pulse is detected at step S165.

Then, when judged at step S165 that the reception start pulse is not detected, the transmission request detecting section returns again to S540. On the other hand, when judged at step S165 that the reception start pulse is detected, the transmission request detecting section proceeds to step S510.

On the other hand, when judged at step S520 that the transmission request flag is ON, because an unprocessed transmission request is present before the current reception start pulse is detected, the transmission request detecting section sets the currently set value of the access control start counter to the transmission request counter to process the un-transmitted transmission request (step S530), and returns to step S115.

As a result, when the un-transmitted transmission request is present, the access control start timing set by the transmission request can be used instead as a new transmission request generating timing. This serves as preparation for when the timing shift section again calculates the access control start timing using an expression (4) when the packet being received is a long packet:

$$Ts = Tr \cdot Tc/(Tp+Tc) \qquad (4),$$

which can be modified to $$T2 = T1 \cdot Tc/(Tp+Tc) \qquad (4'),$$

where T2 denotes the delay time and T1 denotes the elapsed time.

As shown in FIG. 10, first at step S215, the timing shift section judges whether the reception end pulse outputted from the transmitting and receiving circuit 10 is detected. As a result, the timing shift section waits until the transmitting and receiving circuit 10 completes the reception of the transmission data from another radio communication apparatus.

Next, when judged at step S215 that the reception end pulse is detected, the timing shift section proceeds to S610 and judges whether the packet length counter is equal to or more than a judgment value (threshold value) set in advance. As a result, the timing shift section can judge whether the current reception packet is a long packet exceeding the predetermined packet length determined by the judgment value or a short packet. The judgment value can be a fixed value or a variable value determined by a calculation of some sort.

When judged at step S610 that the packet length counter is equal to or more than the judgment value set in advance and the current reception packet is judged to be the long packet, the timing shift section proceeds to step S230 and judges whether the transmission request flag is ON. When the transmission request flag is ON, because the transmission request is already received, the timing shift section proceeds to step S240, calculates the value of the access control counter using the expression (4), and proceeds to the access control pulse transmission process at step S295.

Next, when judged at step S230 that the transmission request flag is OFF, the timing shift section resets the transmission request counter to the value "0" at step S250 and judges whether the reception start pulse is detected at subsequent step S255. Then, when the reception start pulse is detected, the timing shift section returns again so to S215. When the reception start pulse is not detected, the timing shift section returns again to S270 and judges whether the transmission request flag is ON.

When judged at step S270 that the transmission request flag is OFF, the timing shift section returns again to S265. On the other hand, when judged that the transmission flag is ON, the timing shift section uses a following expression (5) set in a similar manner to the above-described expression (3) and calculates the value of the access control counter at step S280.

$$Ts = Tp \cdot (Tc - Tr)/(Tp + Tc) \quad (5)$$

The timing shift section then proceeds to the access control pulse transmission process at step S295.

Next, when judged that the packet length counter is less that the judgment value set in advance and the current reception packet is a short packet, the timing shift section proceeds to S620 and judges whether the transmission request flag is ON.

Then, when the transmission flag is not ON, this indicates that the transmission request has not been generated until the reception of the short packet is completed. Therefore, at step S625, the timing shift section adds the value of the variable X holding the value of the transmission request counter before the start of reception of the short packet to the transmission request counter and proceeds to S265.

This means that the stored count value of the transmission request counter until before the reception of the packet is added to the value that is the transmission request counter counted upwards from immediately after packet reception. Therefore, this is equivalent to the transmission request counter being continuously counted upwards during the packet reception.

However, when the count value of the transmission request counter exceeds the clock conversion value of the collision relaxation time Tc, the clock conversion value of the collision relaxation time Tc is assigned to the transmission request counter.

At the same time, when judged at step S620 that the transmission request flag is ON, the downward count of the access control start counter has started from before the short packet reception.

The downward count of the access control start counter is stopped during the reception of the short packet. Therefore at subsequent S630, to supplement the amount of downward count during the packet reception, the value of the packet length counter is subtracted from the access control start counter. The timing shift section proceeds to the access control pulse transmission process at step S295. However when the subtraction result is zero or less, zero is assigned to the count value of the access control start counter.

Next, the access control pulse transmission process at step S295 is performed by procedures shown in FIG. 11.

In other words, in the access control pulse transmission process according to the embodiment, at step S300, the timing shift section judges whether the reception start pulse is detected. When the reception start pulse is detected, the process is completed. When the reception start pulse is not detected, the timing shift section counts downward the access control start counter synchronously with the clock until the access control start counter becomes the value "0", using the processes at steps S310 and S320.

Then, when the access control start counter becomes the value "0" (YES-S310), the timing shift section proceeds to S330 and outputs the access control pulse to the access control circuit 14, thereby starting the access control by the access control circuit 14. After setting the transmission request flag to OFF at step S340, the timing shift section completes the process.

In this way, in the radio communication apparatus 7 according to the second embodiment, the transmitting timing and the packet length of the long packet from another radio communication apparatus is unknown. Therefore, every time the transmitting and receiving circuit 10 receives a data packet, the length of the packet is measures and whether the received data packet is a long packet is judged. When judged that a long packet is received, based on the expression (4) or the expression (5) in which the time interval Tb of the long packet is replaced with the collision relaxation time Tc, the access control start timing is set.

Therefore, when a wireless communication system is configured using the radio communication apparatus 2 according to the embodiment, a situation in which a large number of radio communication apparatuses simultaneously starts the access control immediately after the transmission of the long packet from one radio communication apparatus is completed and a temporary excessive traffic state occurs can be prevented. Therefore, like that according to the first embodiment, the probability of packet collision can be reduced in the radio communication apparatus 2 according to the embodiment as well.

According to the embodiment, because the time interval Tb of the long packets is unknown, the start timing of the access control is shifted (delayed) using the collision relaxation time Tc. However, a new long packet may be received before the delayed access control is performed.

Figure 12:
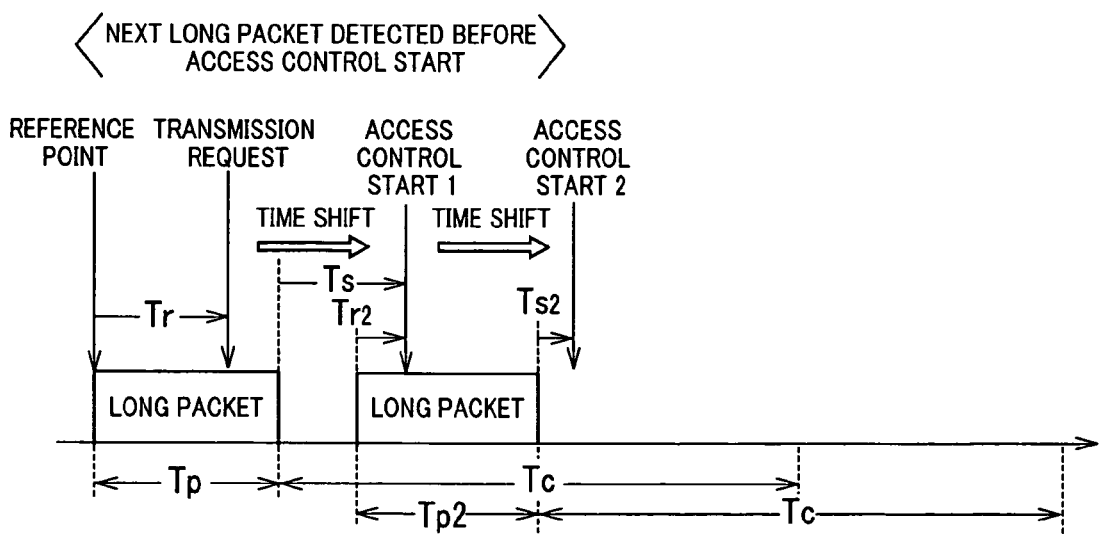
FIG. 12 is an explanatory diagram of an operation performed when long packets are continuously generated according to the second embodiment.

However, according to the embodiment, as shown in FIG. 12, when an access control start timing 1 set when the long packet is first received is after the reception of the next long packet, the access control start timing 1 is further delayed to the access control start timing 2 as a timing at which the transmission request is generated.

Figure 13:
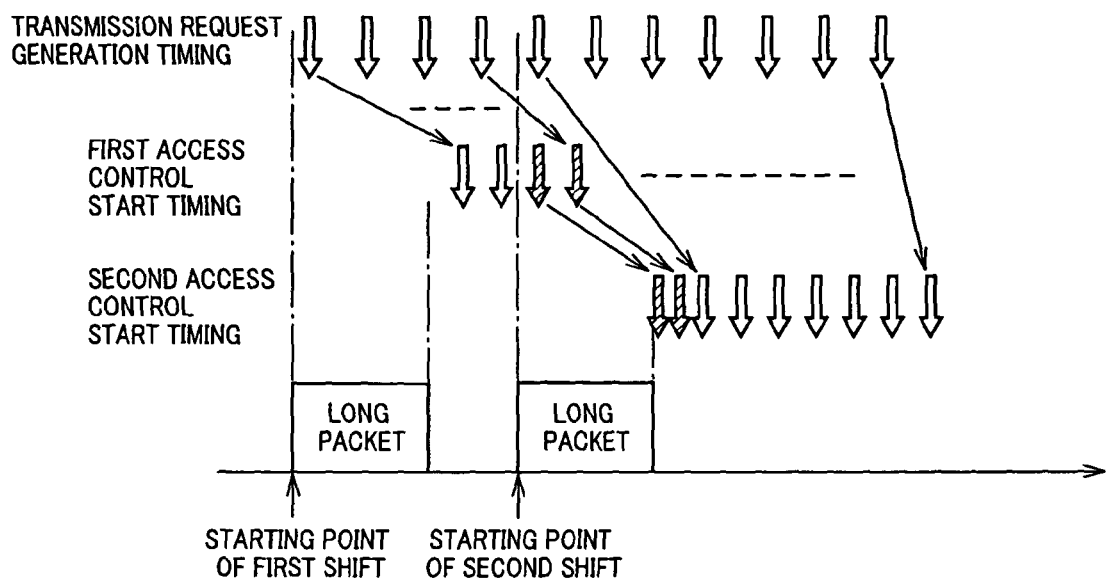
FIG. 13 is an explanatory diagram explaining an effect according to the second embodiment.
Figure 14:
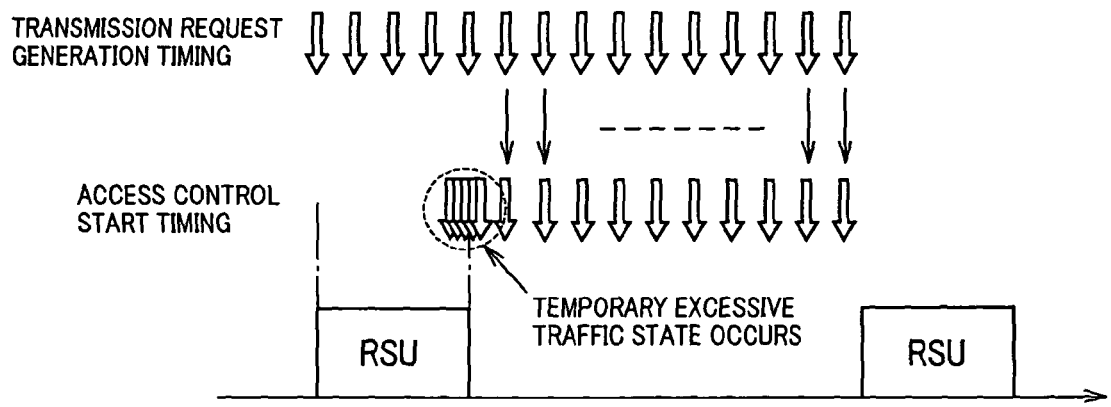
FIG. 14 is an explanatory diagram explaining a conventional problem.

Therefore, as shown in FIG. 13, even when the long packets are generated multiple times during a short interval, the large number of radio communication apparatuses can be prevented from simultaneously starting access control after the completion of the long packet. The probability of packet collision can be reduced.

The embodiments of the present invention have been described above. However, the present invention is not limited to the above-described embodiments. Various embodiments are possible within a scope that does not depart from the spirit of the present invention.

For example, according to the embodiments, the access control of the radio communication apparatuses configuring the wireless communication system is equally distributed over a period during which the long packet is not generated. Therefore, the access control is delayed for not only the transmission request generated during reception of a long packet, but also for the transmission request generated after the reception of the long packet. However, the expected goal of the present invention can be achieved, for example, even when the access control for only the transmission request generated during the reception of the long packet is delayed.

According to each embodiment described above, the delay time of the access control is described as being set in adherence to the above-described expressions. However, because all that is required of the delay time is that the timings at which each radio communication apparatus starts the access control are distributed, for example, a delay time setting method, such as that using random numbers, can be used accordingly in adherence to a purpose.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method of communicating a data packet by radio, wherein the data packet is started to be transmitted on a transmission right acquired on contention type access control in response to a transmission request for the data packet, comprising:
    detecting a predetermined state in which the transmission request is generated in association with reception of a long packet which is over a given packet length, and
    shifting a start timing of the access control to a timing at which a desired delay time passes after completing reception of the long packet, when the predetermined state is detected, wherein
    the shifting includes measuring an elapsed time from a start of reception of the long packet to generation of the transmission request, and
    setting, as the desired delay time, a period of time calculated by multiplying the measured elapsed time by a specified coefficient.

2. The method of claim 1, wherein the transmission request is generated either during or after the reception of the long packet.

3. The method of claim 2, which is implemented in a first radio communication apparatus communicating with a second radio communication apparatus, the first and second radio communication apparatuses being included in a radio communication system in which the second radio communication apparatus transmits the long packet and is fixedly located at a base station, the long packet being repeatedly transmitted at given intervals, the duration of the long packet and the given interval are known,
    wherein the coefficient is a ratio of the interval to a period of time which is a sum of the duration and the interval.

4. The method of claim 3, wherein the second radio communication apparatus is a road-side radio communication apparatus placed at a road as the base station and the first radio communication apparatus consists of a plurality of on-vehicle radio communicating apparatuses each mounted on a vehicle running on the road, and
    the road-side radio communication apparatus is given a time slot given to the road-side radio communication apparatus in priority to the on-vehicle radio communication apparatuses, the road-side radio communication apparatus transmitting the long packet in the time slot, the on-vehicle radio communication apparatuses trying to acquire the transmission right in a vacant time between time slots.

5. The method of claim 2, which is implemented in each of a plurality of first radio communication apparatuses included in a radio communication system in which a second radio communication apparatus that transmits a data packet repeatedly at intervals, a duration of each long packet, and an interval of time between two of the long packets are unknown,
    the method comprising:
    measuring the duration of the data packet every time when receiving the data packet from the second radio communication apparatus,
    determining whether or not the received data packet corresponds to the long packet,
    measuring an elapsed time from a start of reception of the data packet to the generation of the transmission right, and
    setting the coefficient as a ratio of a sum of the duration of the long packet and a preset collision alleviating time to the collision alleviating time, when it is determined that the received data packet is the long packet.

6. The method of claim 5, wherein the delay step comprises:
    determining whether or not there is a specific situation where the long packet is received from the second radio communication apparatus prior to the start timing of the access control which is set after the generation of the transmission right, and
    resetting the start timing of the access control on the assumption that the already set start timing of the access control is the generation timing of the transmission request, when it is determined that the specific situation exists.

7. An apparatus for communicating a data packet by radio, comprising:
    transmission and reception means for transmitting and receiving the data packet;
    access control means for allowing the data packet to be transmitted from the transmission and reception means on a transmission right acquired on contention type access control in response to a transmission request for the data packet;
    communication control means for enabling the access control means to start the access control by generating the transmission request,
    detection means for detecting a predetermined state in which the transmission request is generated in association with reception of a long packet which is over a given packet length, the long packet being received by the transmission and reception means, and
    delay means for delaying an input timing of the transmission request to the access control means so that a start timing of the access control becomes a timing at which a desired delay time passes after completing reception of the long packet, when the predetermined state is detected, wherein
    the delay means is configured to measure an elapsed time from a start of reception of the long packet to generation of the transmission request, and set, as the desired delay time, a period of time calculated by multiplying the measured elapsed time by a specified coefficient.

8. The apparatus of claim 7, wherein the transmission request is generated either during or after the reception of the long packet.

9. The apparatus of claim 8, which is applied to a first radio communication apparatus communicating with a second radio communication apparatus, the first and second radio communication apparatuses being included in a radio communication system in which the second radio communication apparatus transmits the long packet and is fixedly located at a base station, the long packet being repeatedly transmitted at given intervals, the duration of the long packet and the given interval being known, and wherein the coefficient is set to a ratio of the interval to a period of time which is a sum of the duration and the interval.

10. The apparatus of claim 9, wherein the second radio communication apparatus is a road-side radio communication apparatus placed at a road as the base station and the first radio communication apparatus consists of a plurality of on-vehicle radio communicating apparatus each mounted on a vehicle running on the road, and the road-side radio communication apparatus is given a time slot given to the road-side radio communication apparatus in priority to the on-vehicle radio communication apparatuses, the road-side radio communication apparatus transmitting the long packet in the time slot, the on-vehicle radio communication apparatuses trying to acquire the transmission right in a vacant time between time slots.

11. The apparatus of claim 8, which is applied to each of a plurality of first radio communication apparatuses included in a radio communication system in which a second radio communication apparatus transmitting a data packet repeatedly at intervals, a duration of each long packet, and an interval of time between two of the long packets are unknown, wherein the delay means includes:
means for measuring the duration of the data packet every time when receiving the data packet from the second radio communication apparatus,
means for determining whether or not the received data packet corresponds to the long packet,
means for measuring an elapsed time from a start of reception of the data packet to the generation of the transmission right, and
means for setting the coefficient as a ratio of a sum of the duration of the long packet and a preset collision alleviating time to the collision alleviating time, when it is determined that the received data packet is the long packet.

12. The method of claim 11, wherein the delay means includes determining means for determining whether or not there is a specific situation where the long packet is received from the second radio communication apparatus prior to the start timing of the access control which is set after the generation of the transmission right, and
re-delay means for re-delaying the start timing of the access control on the assumption that the already set start timing of the access control is the generation timing of the transmission request, when it is determined that there is the specific situation.

\* \* \* \* \*

UNITED STATES PATENT AND TRADEMARK OFFICE
CERTIFICATE OF CORRECTION

| | | |
|---|---|---|
| PATENT NO. | : 8,036,206 B2 | Page 1 of 1 |
| APPLICATION NO. | : 12/171364 | |
| DATED | : October 11, 2011 | |
| INVENTOR(S) | : Masato Matsumoto and Kazuoki Matsugatani | |

It is certified that error appears in the above-identified patent and that said Letters Patent is hereby corrected as shown below:

Title page, Item (75) Inventors:

Change "Masao Matsumoto" to
--Masato Matsumoto--.

Signed and Sealed this
Twenty-ninth Day of November, 2011

David J. Kappos
*Director of the United States Patent and Trademark Office*